United States Patent [19]

Price

[11] Patent Number: 5,409,618
[45] Date of Patent: Apr. 25, 1995

[54] FLUID CLASSIFIER

[75] Inventor: Paul D. Price, Ellwood City, Pa.

[73] Assignee: Kenneth E. Price, Claremont, Calif.; a part interest

[21] Appl. No.: 145,824

[22] Filed: Nov. 3, 1993

[51] Int. Cl.⁶ ............................................. B01D 33/70
[52] U.S. Cl. ....................... 210/784; 210/86;
210/194; 210/384; 210/402; 210/416.1;
210/785; 210/805
[58] Field of Search ................. 210/86, 47, 109, 256,
210/295, 297, 319, 320, 384, 359, 416.1, 744,
780, 784, 785, 800, 806, 192, 194, 402, 805

[56] References Cited

U.S. PATENT DOCUMENTS

| | | | |
|---|---|---|---|
| 143,676 | 10/1873 | Demailly | 210/297 |
| 2,534,760 | 12/1950 | Ellila | 210/402 |
| 2,540,474 | 2/1951 | Cox | 210/320 |
| 3,489,679 | 1/1970 | Davidson et al. | 210/384 |
| 3,707,230 | 12/1972 | Davidson | 210/384 |
| 3,713,540 | 1/1973 | Davidson et al. | 210/384 |
| 4,902,410 | 2/1990 | Botsch | 210/402 |

Primary Examiner—Joseph W. Drodge
Attorney, Agent, or Firm—Harris, Wallen MacDermott & Tinsley

[57] ABSTRACT

A fluid classifier for separating particles from a lading for operation with a lading tank including a filter unit for mounting in the tank and having capillary passages for fluid flow from the tank externally of the filter unit to the interior of the filter unit for providing a pressure differential across the capillary passages resulting from a difference in fluid level in the tank and within the filter unit, a drive for rotating the filter unit in the tank, and a pump for pumping fluid from filter unit interior to the outlet. Ultrasonic transducers positioned along the filter unit for agitating the lading adjacent the capillary passages. A method of controlling fluid flow through the capillary passages.

11 Claims, 2 Drawing Sheets

FLUID CLASSIFIER

BACKGROUND OF THE INVENTION

This invention relates to the removal of small solids from flowing fluids.

There are many industrial operations, such as blast furnaces, power plants, coke oven batteries and the like, that produce by-products that are detrimental to the environment. Such by-products are, generally, fine solid particles.

One method of capturing these particles so that they may be properly processed for disposal is by means of a scrubber. The scrubber places the particles into a solution that discharges into a settling basin where separation and particle precipitation can take place.

Such installations are large and expensive and the timing depends on the influence of gravity on the particles in the solution mixture.

Scrubbers are satisfactory for entraining the discharging particles but there could be a great improvement in the equipment utilized beyond the scrubber.

Desirably such equipment should be relatively small and an in-line facility that would return the water to operations and isolate or purge the particles for a controlled disposal.

One apparatus proposed to accomplish such purpose has been termed a fluid classifier. Such apparatus functions to withdraw the liquid from a lading (mixture of liquid and solid particles) while preventing onward flow of the solid particles. The liquid, which is in most cases water, can immediately return to process and the particles will agglomerate and precipitate by designation for disposal.

One such fluid classifier is comprised of a filter element (woven wire cloth) in cylindrical or sleeve form closed at one end and open at the other end to a pump suction. This cylinder is immersed in the lading in such manner that there is relative movement between the outer cylinder surface and the lading.

Filter action is from the outside or lading side of the sleeve to the inside or pump suction connection. This relation always maintains the particles in the incoming lading volume from where they precipitate into a sump, and at the same time allows the pump to move the clean liquid to its designation.

Relative motion between the sleeve and the lading subjects the particles to conditions of dynamics and probability with the result that unless the particles can act like the liquid they will not succeed in gaining passage through the filter interstices. The size of the openings in the filter element is of capillary order.

A back-wash action for clearing the flow can be obtained by an increase in rotational speed. Such action was effective but was necessarily intermittent. A continuous clearing action which precludes the need for back-wash can be obtained with a separate pumping system that sucks a volume of lading from the surface of the adjacent rotating filter unit. A gradient suction chamber typically with a nozzle narrow for the height of the filter surface is operated at the same suction pressure as that within the filter unit, giving uniform suction the full height of the filter. It can continually act to prevent particle build-up at the filter unit influent surface without affecting the fluid classifier operation or efficiency.

The apparatus as described above has operated in the separation of solid particles from lading, though some problems have been encountered and it is an object of the present invention to provide a new and improved fluid classifier.

SUMMARY OF THE INVENTION

It is the object of the invention to provide a new and improved fluid classifier and method of operating a fluid classifier which avoid the use of pump suction for control of flow through the filter unit. More particularly it is an object to provide a fluid classifier which utilizes atmospheric pressure and liquid surface level differential as the motive force to control flow across the capillary passages in the filter from the lading tank to the interior of the filter unit, and also to utilize the liquid surface elevation differential between the interior of the filter unit and the tank exit chamber for controlling flow.

It is a further object of the invention to provide a fluid classifier incorporating one or more ultrasonic transducers for controlling particle action at the filter unit internally and/or externally of the filter unit.

A particular object is to provide such a fluid classifier with a variable outlet level for controlling the liquid level in the outlet tank for controlling the differential pressure. An additional object is to provide means for measuring the liquid level and providing automatic control of pressure differential.

It is an additional object of the invention to provide a hydraulic back-wash for pumping filtered liquid in a reverse direction through the filter unit along with a suction system at the upstream side of the filter unit.

These and other objects, advantages, features and results will more fully appear in the course of the following description.

The presently preferred embodiment of the fluid classifier includes a filter unit for mounting in a tank and having capillary passages for fluid flow from the tank externally of the filter unit to the interior of the filter unit for providing a pressure preferential across the capillary passages resulting from a difference in fluid level in the tank and within the filter unit, a drive for rotating the filter unit, and a pump for pumping fluid from the filter unit interior to the fluid outlet. The fluid classifier may further include an ultrasonic transducer positioned along the filter unit for agitating the lading adjacent the capillary passages.

The fluid classifier may further include an exit chamber, a fluid outlet line from the interior of the filter unit to the exit chamber, and apparatus for changing the outlet level of the fluid outlet line to adjust the hydrostatic head of liquid in the exit chamber, with the pump pumping fluid from the exit chamber to the fluid outlet, and if desired, a level measuring unit for determining the fluid level in the exit chamber.

In the presently preferred embodiment of the invention the filter unit is supported from below and the effluent is removed from the bottom of the filter unit. In one alternative embodiment, the filter unit is supported from above and the effluent is removed from the top of the filter unit.

The invention also includes the method of controlling fluid flow from the capillary passages of the filter unit by controlling the hydrostatic head across the filter unit between the tank and the interior of the filter unit, and controlling the hydrostatic head between the interior of the filter unit and the exit chamber to prevent formation of a meniscus at the downstream end of the capillary passages through the filter of the filter unit so that capillary flow is maintained through the capillary passages.

DESCRIPTION OF THE PREFERRED EMBODIMENTS

Figure 2:
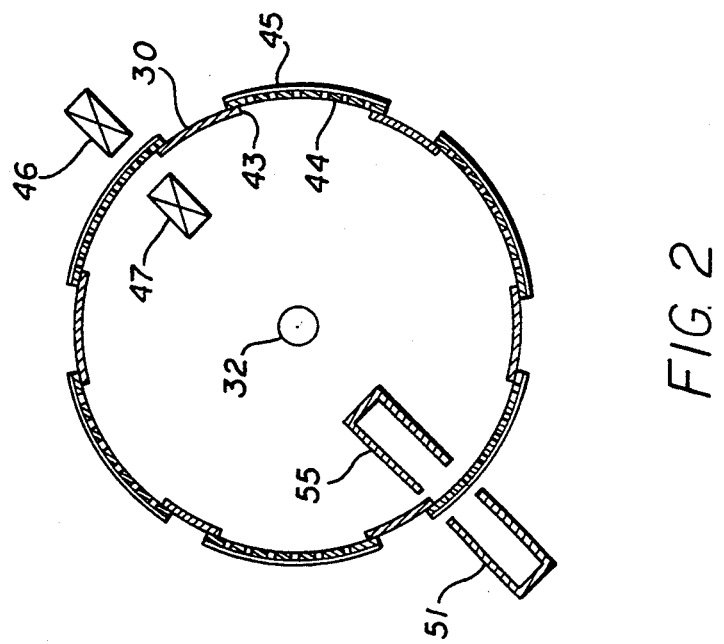
FIG. 2 is a sectional view taken along the line 2—2 of FIG. 1.
Figure 1:
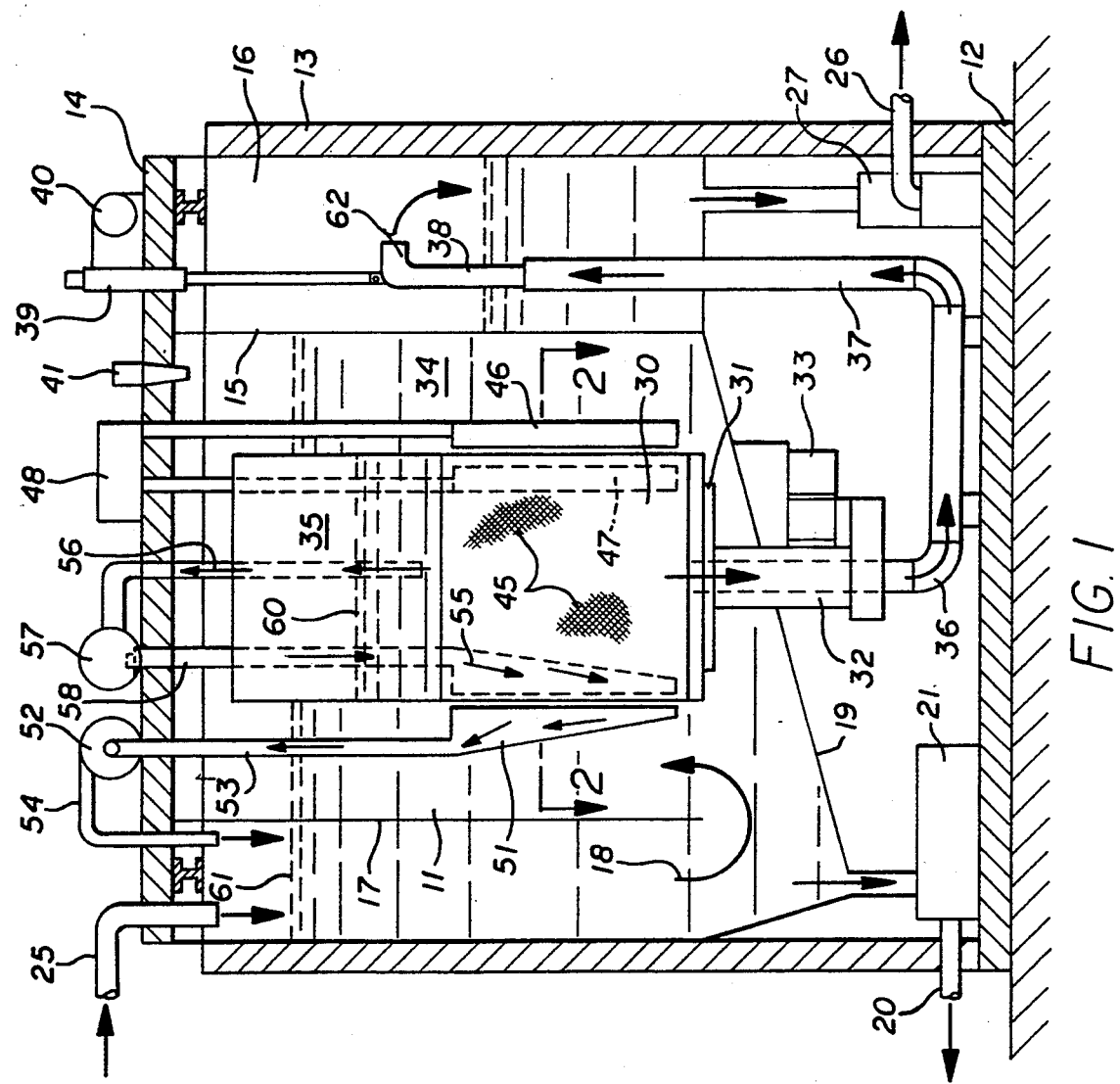
FIG. 1 is a vertical section through a tank incorporating the presently preferred embodiment of the fluid classifier of the invention with the filter unit supported from below.

Referring to FIGS. 1 and 2, a tank 11 is supported in a shell with a bottom 12 and side wall 13. The tank has a top 14 positioned above the rim of the side wall 13, providing an opening at the upper end of the tank to the atmosphere. A baffle 15 within the tank provides an exit chamber 16. Another baffle 17 may be provided in the tank for separating incoming lading from the remainder of the tank, with flow under the lower end of the baffle 17, as indicated at 18. The tank has a sloping bottom 19 for collection of precipitants which are removed through line 20 by a sludge pump 21.

The lading is introduced into the tank through a lading inlet line 25 and the liquid is withdrawn from the exit chamber through an outlet line 26 with a pump 27.

The fluid classifier includes a filter unit 30 mounted on a turntable 31 with a turntable mount 32 driven by a motor 33 for rotating the filter unit within the main chamber 34 of the tank. The fluid flows from the interior 35 of the filter unit downward through the turn table, a rotary coupling 36 and a line 37 to an overflow outlet 38 in the exit chamber 16. The overflow outlet 38 is moved vertically in the line 37 by a positioner 39 driven by a motor 40 for controlling the hydrostatic head between the interior of the filter unit and the exit chamber 16. A fluid level position sensor 41 may be mounted in the top 14 for sensing the fluid level of the lading within the main chamber 34 of the tank. The measured output from the sensor 41 may be used as an imput to the positioner 39 for controlling the hydrostatic head between the main chamber 34 and the exit chamber 16. Also, the output from the sensor 41 may be used for controlling the pump 27 for controlling the difference in elevation of the fluids in the two chambers for controlling hydrostatic head.

The filter unit 30 typically is a sleeve open at the top and closed at the bottom except for the outlet line 37. Typically openings 43 in the sleeve are covered with a fine mesh filter material 45 supported on perforated plates 44 to provide for fluid flow from the main chamber 34 into the interior 35 of the filter unit. Typically, the filter material is woven wire cloth having capillary passages or columns and also high strength. The filter unit sleeve may be in a form of a metal grid with filter material positioned at the openings of the grid to improve the strength of the unit. A typical filter material will have 10 micron openings and be 1/16th inch thick. With 10 micron openings, there are 280,000 openings per square inch of the filter surface. The length of a 10 micron capillary passage, that is, the heigheth of the liquid column when in equilibrium, is the thickness of the filter, typically 1/16th inch. This places the meniscus of the capillary column at the inner surface of the filter and the base at the outer surface of the filter. The capillary passage is fed from its base by a film on the outer surface on the filter. The ratio of capillary passage length to passage diameter is about 160 to 1 indicating that high energy would be required to push a liquid through the passages, while only low energy is required to coax liquid through the passages. In the prior designs, the pump suction has been utilized for moving the liquid through the capillary passages. In the present invention, differences in liquid level producing hydrostatic head is used to accomplish this desirable operation.

An undisturbed fluid flows through a capillary passage until it reaches a state of equilibrium and establishes a meniscus. The meniscus contributes to the state of equilibrium and when equilibrium is not obtained, fluid will continue to flow through the capillary passage, seeking equilibrium. If a meniscus is continually denied, continual capillary flow is established and in the system of the invention, such meniscus prevention is established by maintaining the hydrostatic heads. The preferred range for the capillary interstices is between about 25 microns at the upper level and about 5 microns at the lower level.

It has been found that improved filter flow can be achieved by agitating the surface of the filter with ultrasonic energy. In the embodiment illustrated, an ultrasonic transducer 46 is positioned at the exterior of the filter unit and another ultrasonic transducer 47 is positioned at the interior. Both transducers are driven by a generator 48 which may be mounted on the top of the tank. Alternatively, only the exterior transducer 46 or only the interior transducer 47 may be used. The ultrasonic transducers may be conventional in design and typically operate in the range of about 25 to about 40 khz with energy levels at about 35 watts (average) per gallon.

Suction may be utilized for removing particles from the outer surface of the filter unit for improved capillary flow. One such arrangement is shown in the drawing figures, with a nozzle 51 positioned along the sleeve 44. A pump 52 draws lading from the exterior of the sleeve into the nozzle 51, up the line 53, through the pump and back to the tank through a line 54. Also, a back-wash may be provided through another nozzle 55 positioned within the sleeve, preferrably opposite the nozzle 51. Back-washing liquid is pumped from the interior of the filter unit through a line 56, a pump 57 and a line 58 to the nozzle 55.

The operation of the fluid classifier is continuous, with lading entering through line 25, filtered liquid exiting through line 26, and precipitated sludge exiting through line 20. The differential pressure between atmosphere and the surface level 60 within the filter unit provides the motive force for influencing flow from the tank through the capillary passages into the interior of the filter unit. The difference in surface elevation or hydrostatic head between the level 61 of the tank and the level 60 within the filter unit determines the magnitude of the motivating force along the capillary passages. Similarly the liquid effluent from the filter unit flows into the exit chamber 16 through the outlet 38, as a result the elevation difference between the level 60 and the level 62 at the outlet 38, with the level 62 being adjustable. By controlling the hydrostatic head between the interior of the filter unit and the exit so that a meniscus is continually denied, continual capillary flow is established and maintained.

Fluid flow through the fluid classifier is controlled by controlling the hydrostatic head across the filter unit between the tank and the interior of the filter unit, and controlling the hydrostatic head between the interior of the filter unit and the exit chamber to prevent formation of a meniscus at the downstream end of the capillary passages through the filter of the filter unit so that capillary flow is maintained through the capillary passages. Also fluid is pumped from the exit chamber at a controlled rate and delivered from the interior of the filter unit to the exit chamber through a pipeline and the vertical position of the outlet of the pipeline is adjusted.

Figure 3:
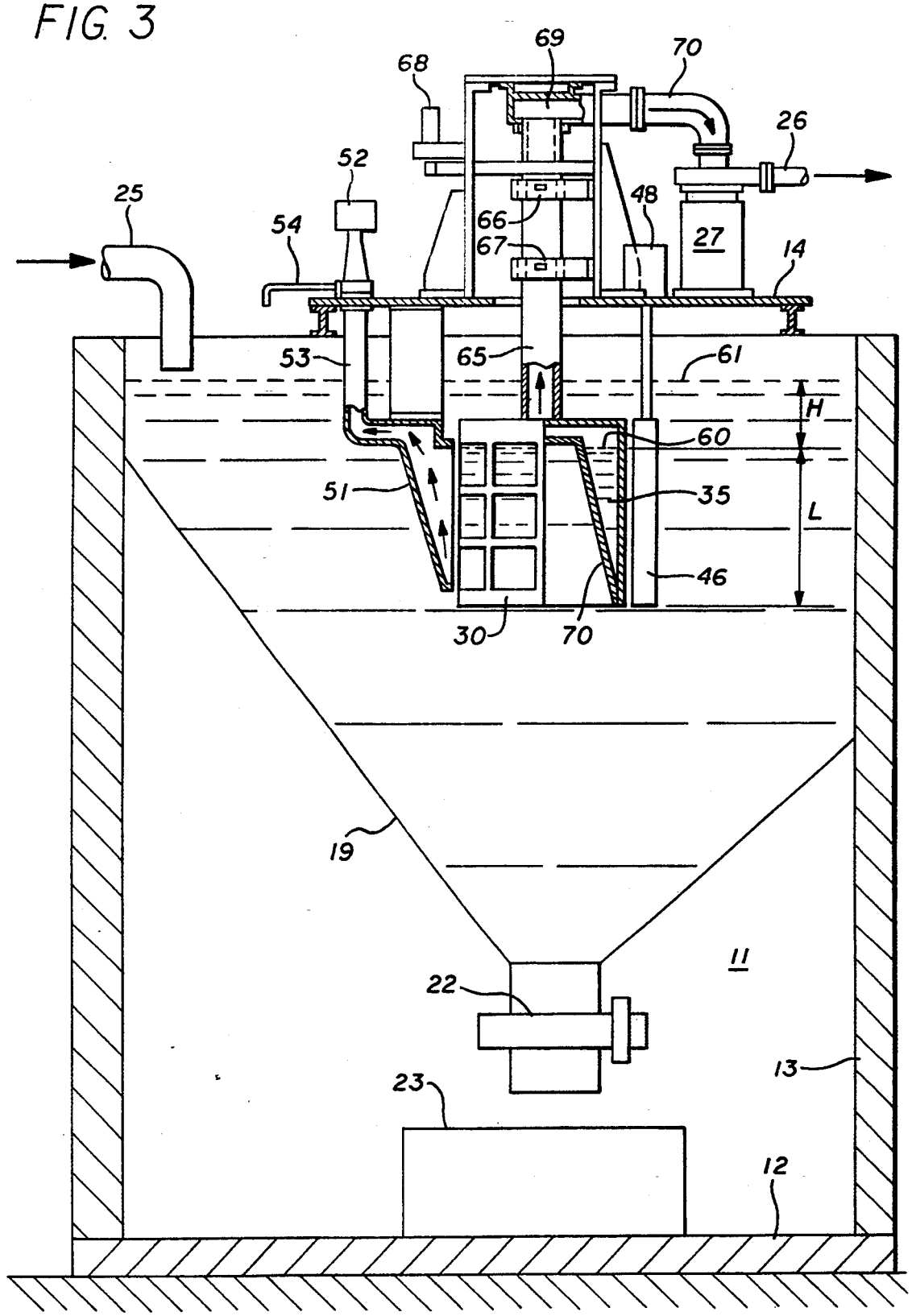
FIG. 3 is a view similar to that of FIG. 1 with the filter unit supported from above.

In the alternative embodiment of FIG. 3, components corresponding to those of the embodiment of FIGS. 1 and 2 are identified by the same reference numbers.

Referring to FIG. 3, a tank 11 is supported in a shell with a bottom 12 and side wall 13. The tank has a top 14 positioned above the rim of the side wall 13, providing an opening at the upper end of the tank to the atmosphere. The tank has a sloping bottom 19 for collection of precipitants which are removed through a drain valve 22 into a sludge box 23.

The lading is introduced into the tank through a lading inlet line 25 and the liquid is withdrawn through an outlet line 26 with a pump 27.

The fluid classifier includes a filter unit 30 carried on a hollow spindle 65 in bearings 66, 67 and driven by a motor 68 for rotating the filter unit within the chamber of the tank. The fluid flows from the interior 35 of the filter unit upward through the spindle 65, a cap 69 and a line 70 to the outlet 26.

In the embodiment of FIG. 3, the filter unit 30 typically is a sleeve opening at the top to the spindle 65 and closed at the bottom by a frustoconical bottom 70. The filter material and perforated filter may be the same as in the first embodiment.

An ultrasonic transducer 46 is positioned at the exterior of the filter unit and is driven by a generator 48 which may be mounted on the top of the tank.

A suction nozzle 51 is positioned along the sleeve of the filter unit. A pump 52 draws lading from the exterior of the sleeve into the nozzle 51, up the line 53, through the pump and back to the tank through a line 54.

The operation of the fluid classifier of FIG. 3 is as described for the embodiment of FIG. 1 and 2, with lading entering through line 25, filtered liquid exiting through line 26, and precipitated sludge exiting through valve 22. The differential pressure between atmosphere and the surface level 60 within the filter unit provides the motive force for influencing flow from the tank through the capillary passages into the interior of the filter unit. The difference in surface elevation or hydrostatic head between the level 61 of the tank and the level 60 within the filter unit determines the magnitude of the motivating force along the capillary passages.

Features of the present invention include the use of ultrasonic transducers which aid the rejection of solid particles near the wire cloth filter windows, the provisions for effluent flow from the interior of the filter through the turntable and rotary coupling to the outlet, and operation with a pressure differential of about one psi resulting from the liquid surface level differential.

I claim:

1. In a fluid classifier for operation with a lading tank having a lading inlet and a fluid outlet, the combination of:
 a filter unit for mounting in said tank, said filter unit having capillary passages for fluid flow from the tank externally of said filter unit to the interior of said filter unit for providing a pressure differential of about one psi across said capillary passages resulting from a difference in fluid level of said tank and within said filter unit;
 drive means for rotating said filter unit;
 first pump means for pumping fluid from said filter unit interior to said fluid outlet;
 ultrasonic transducer means positioned along said filter unit for agitating lading adjacent said capillary passages;
 a nozzle with an inlet opening positioned along the exterior of said filter unit; and
 second pump means for draining agitated lading into said nozzle inlet opening and back to said tank.

2. A fluid classifier as defined in claim 1 wherein said ultrasonic transducer means is positioned at the exterior of said filter unit.

3. A fluid classifier as defined in claim 1 wherein said ultrasonic transducer means is positioned at the interior of said filter unit.

4. A fluid classifier as defined in claim 1 wherein said ultrasonic transducer means includes a first transducer along the exterior of said filter unit and a second transducer along the interior of said filter unit.

5. In a fluid classifier for operation with a lading tank having a lading inlet and a fluid outlet, the combination of:
 a filter unit for mounting in said tank, said filter unit having capillary passages for fluid flow from the tank externally of said filter unit to the interior of said filter unit for providing a pressure differential across said capillary passages resulting from a difference in fluid level of said tank and within said filter unit;
 drive means for rotating said filter unit;
 first pump means for pumping fluid from said filter unit interior to said fluid outlet;
 ultrasonic transducer means positioned along said filter unit for agitating lading adjacent said capillary passages;
 a nozzle with an inlet opening positioned along the exterior of said filter unit, and
 second pump means for pumping lading from said nozzle inlet opening back to said tank;
 said filter unit including a sleeve with said capillary passages extending along the length of said sleeve from a first level to a second level, and wherein
 said nozzle extends along said length of said sleeve and overlying a segment of said capillary passages, and
 said ultrasonic transducer means extends along said length of said sleeve and spaced angularly from said nozzle.

6. A fluid classifier as defined in claim 5 wherein the lower end of said sleeve is closed and the upper end of said sleeve is open, with said first pump means being in fluid communication with said lower end of said sleeve.

7. A fluid classifier as defined in claim 5 wherein the upper and lower ends of said sleeve are closed, with said first pump means being in fluid communication with said upper end.

8. A fluid classifier as defined in claim 5 including:
 an exit chamber;
 a fluid outlet line from the interior of said sleeve to said exit chamber; and
 means for changing the outlet level of said fluid outlet line to adjust the hydrostatic head of liquid in said exit chamber;

with said first pump means pumping fluid from the exit chamber to said fluid outlet.

9. A fluid classifier as defined in claim 8 including level measuring means for determining the fluid level in said exit chamber.

10. In a method of controlling fluid flow through a fluid classifier having a tank with an exit chamber and a rotating filter unit with an interior chamber, the steps of:
   controlling the hydrostatic head across the filter unit between the tank external of the filter unit and the interior of the filter unit providing a differential pressure of about one psi,
   controlling the hydrostatic head between the interior of the filter unit and the exit chamber to prevent formation of a meniscus at the downstream end of the capillary passages through the filter of the filter unit so that capillary flow is maintained through the capillary passages;
   agitating fluid along the exterior of the filter unit by ultrasonic vibrations to produce an agitated fluid; and
   drawing the agitated fluid from the exterior of the filter back into the tank.

11. The method as defined in claim 10 including pumping fluid from the exit chamber at a controlled rate and delivering fluid from the interior of the filter unit to the exit chamber through a pipeline and adjusting the vertical position of the outlet of the pipeline.

* * * * *